June 7, 1949. H. R. VAN VLECK 2,472,450
MOTOR VEHICLE
Filed Feb. 14, 1946 3 Sheets-Sheet 1

INVENTOR
HORACE R. VAN VLECK
BY
Pennie, Edmonds, Morton & Barrows
ATTORNEYS

June 7, 1949.  H. R. VAN VLECK  2,472,450
MOTOR VEHICLE
Filed Feb. 14, 1946  3 Sheets-Sheet 2
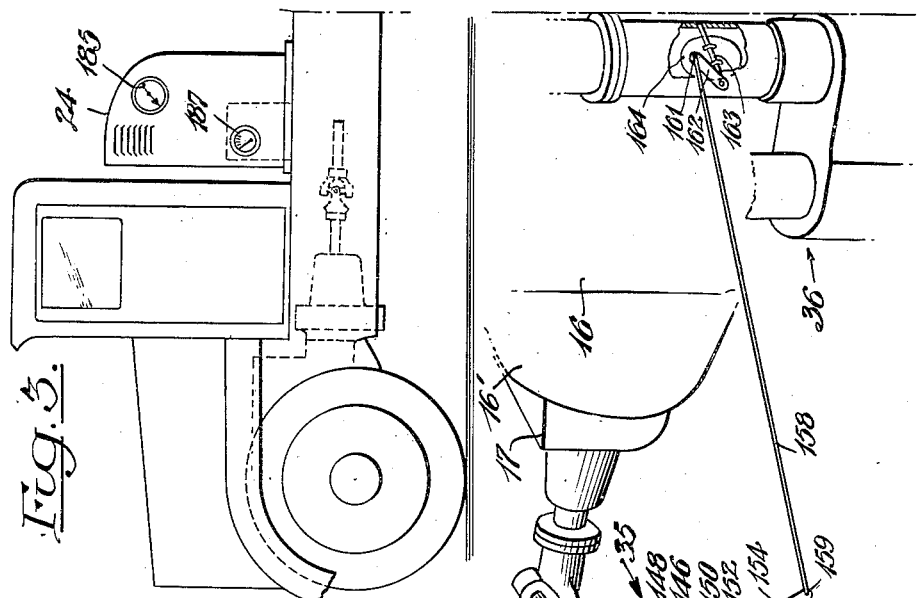
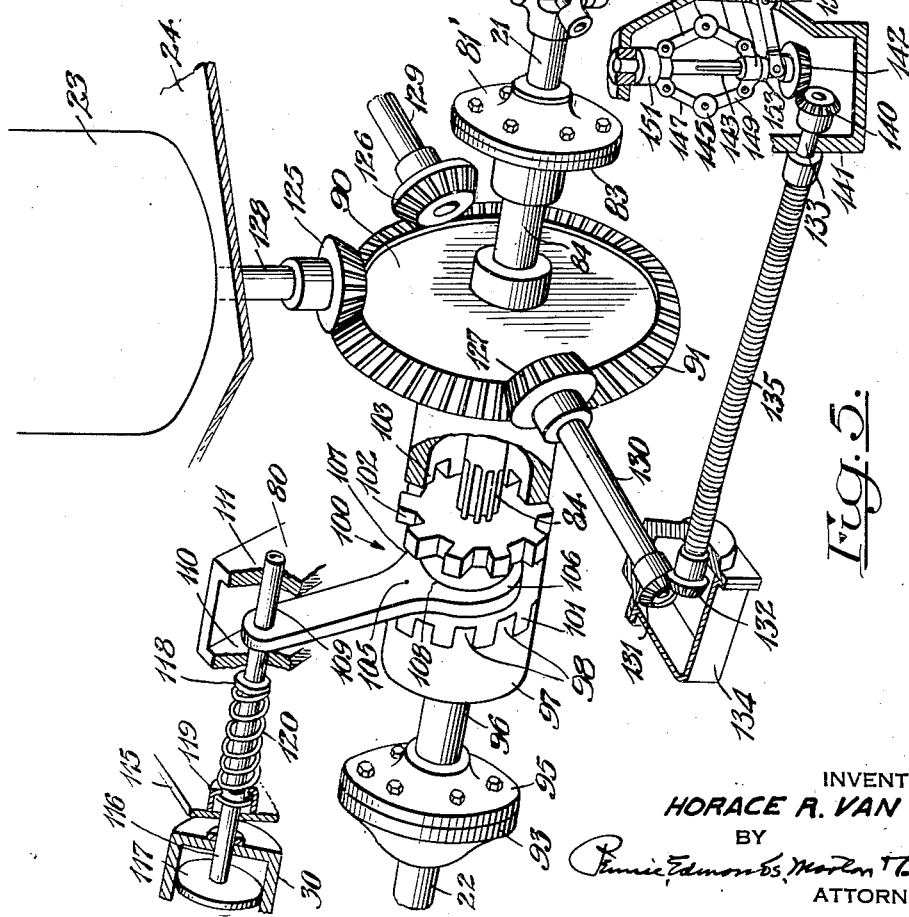
INVENTOR
*HORACE R. VAN VLECK*
BY
Pennie Edmonds Morton & Barrows
ATTORNEYS June 7, 1949.  H. R. VAN VLECK  2,472,450
MOTOR VEHICLE Filed Feb. 14, 1946  3 Sheets—Sheet 3

INVENTOR
HORACE R. VAN VLECK
BY
ATTORNEYS

Patented June 7, 1949

2,472,450

UNITED STATES PATENT OFFICE 2,472,450

MOTOR VEHICLE

Horace R. Van Vleck, Upper Montclair, N. J.

Application February 14, 1946, Serial No. 647,583

7 Claims. (Cl. 180—53)

This invention relates to motor vehicles and has for its object certain highly useful improvements in their construction to permit the use of a power take-off device to operate a generator at a substantially constant and predetermined speed to assure the generation of a substantially constant and predetermined amount of electrical current.

Many motor vehicles employed to handle liquid fuel, oil and gasoline, are provided with power take-off devices mechanically coupled to pumps to deliver the fuel. Such an arrangement has worked quite well on trucks but is of course not well adapted for tractor-trailers, which are coming into widespread use. Furthermore, as now constructed, these trucks cannot deliver the fuel as rapidly as desired for certain purposes. In the case of tractor-trailers, it has also been proposed to use a power take-off device to generate electrical current with which in turn to operate the pumps, the power take-off and generator being on the tractor and the pumps being on the trailer. The amount of current generated fluctuates so widely that the pumps cannot be operated at constant and predetermined speeds, with consequent fluctuation in amount of fuel delivered, and the amount of current generated is insufficient to operate the pumps as rapidly as desired, or to operate larger pumps. Equipment with such limited performance is particularly disadvantageous when it is desired quickly to refuel air liners at airport stops along their route. This operation should take no more time than that required normally to load and unload passengers. There is therefore a pronounced need for motor vehicle equipment capable of pumping much greater quantities of liquid fuel per minute than has heretofore been possible.

Investigation confirms my discovery that motor vehicles of the kind commonly employed may be greatly improved in construction so as substantially to overcome the disadvantages of the customary practice. The power take-off and generator may be so coupled as to permit the operation of the generator at a substantially constant and predetermined speed and therefore to generate a substantially constant and predetermined amount of electrical current voltage with which to operate the pumps.

In accordance with the invention, the improvement comprises a power take-off operatively associated with the propeller shaft of the vehicle, the power take-off having at least two power take-off shafts. One of the power take-off shafts is operatively connected with a generator supported by the vehicle, another power take-off shaft being operatively connected with a governor. The governor is in turn operatively connected with a throttle valve in the carburetor of the vehicle engine, so that the engine, and hence the generator, may be operated at a predetermined speed to assure the generation of substantially a predetermined amount of electrical current voltage.

While any suitable power take-off may be employed, it may advantageously take the form of one of those disclosed in my copending application Serial No. 520,633, filed February 1, 1944, now abandoned. In such construction gear ratios may be readily selected to permit operation of the generator at high speed and the motor or engine at low speed, thus reducing wear and tear on the engine and economizing on fuel consumption.

The generator is advantageously mounted on the vehicle directly above the power take-off. This is particularly suitable in a tractor-trailer arrangement because the space necessary for the generator is readily provided on the top of the tractor intermediate its cab and the front end of the trailer when hooked onto the tractor. The space, moreover, is ample for a sufficiently large generator. On the other hand, the generator may of course be mounted at any other suitable place, for example below the chassis of the vehicle, whether truck or tractor. Space is usually at a premium, however, in the case of trucks, particularly if a large generator is required. For that and other reasons the tractor-trailer arrangement is to be preferred when possible.

These and other features of the invention will be better understood by referring to the accompanying drawings, taken in conjunction with the following description, in which—

Fig. 3 is a side elevation in part from the opposite side, with cutaway portions;

Fig. 5 is an enlarged interior diagrammatic perspective view showing the manner in which the parts are coupled.

Figure 1:
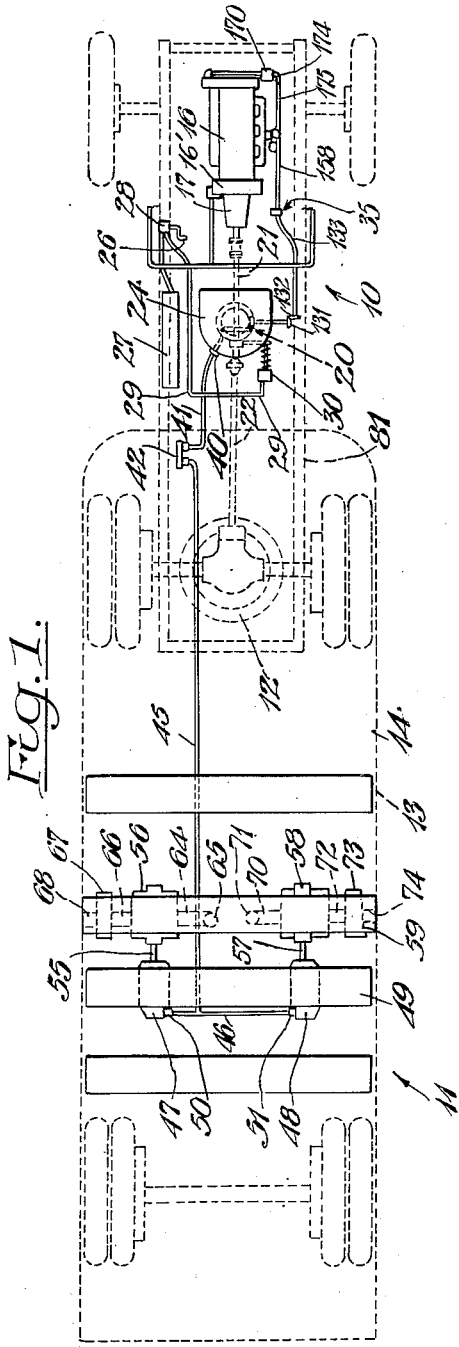
Fig. 1 is a diagrammatic plan view with cutaway portions of a tractor-trailer arrangement illustrative of a practice of the invention.

Referring first to Fig. 1, the apparatus shown comprises a tractor 10 of any desired form which is connected to a tank-trailer 11 by a suitable coupling or swivel joint, such as a fifth wheel 12. The trailer includes a chassis 13 and a tank 14 housed in a body 15 on the chassis, the tank being provided with openings (not shown) through which it may be filled with liquid fuel.

Figure 2:
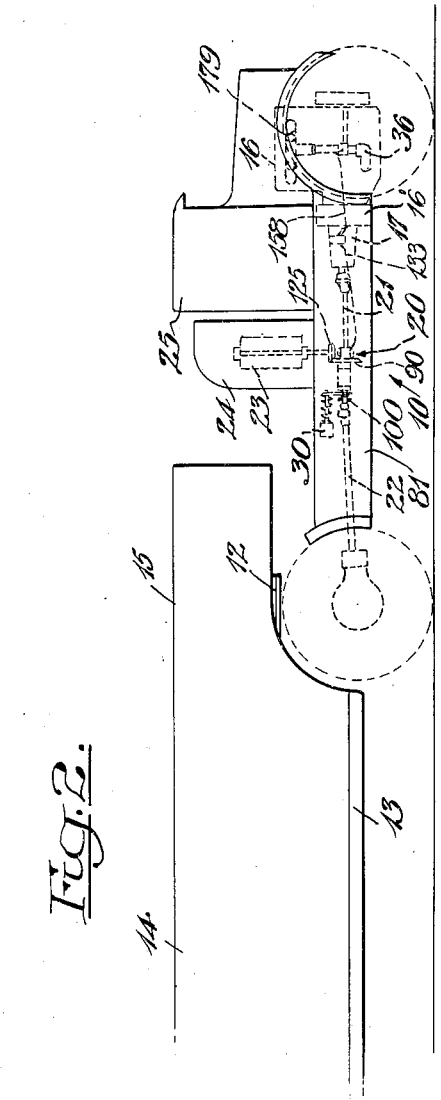
Fig. 2 is a side elevation with cutaway portions.

The tractor includes an engine or motor 10 which may be of the internal combustion type, the usual clutch, enclosed in a housing 16', and the usual transmission or gear box 17 which is connected to the rear wheels of the tractor through a power take-off 20 intermediate a forward propeller shaft section 21 and a rearward propeller shaft section 22. As better shown in Fig. 2, the power take-off connects vertically with a generator 23 in a housing 24, both of which are supported on top of the tractor directly behind its cab 25. The generator is normally disconnected from the tractor engine and to this end the power take-off is provided with a clutch, to be described below, operated by a selector 26 which may, in turn, be coupled mechanically, electrically, hydraulically or pneumatically with the power take-off clutch. In the present construction, the operation is pneumatic, the necessary compressed air being obtained from an air tank 27 (communicating with air brakes, not shown, for the wheels, for example as shown in my U. S. Patent 2,351,646 of June 20, 1944). To this end, the selector connects with an air valve 28 which controls the flow of air from the tank through a conduit 29 communicating with a piston cylinder 30. As better shown in Figs. 1 and 4, the power take-off also connects laterally with a governor 35 which, in turn, connects with a carburetor 36 associated with the engine.

The terminals of generator 23 are connected by wires to a socket 40 secured to housing 24 and a cable 41 having a plug at each end is connected at one end to the socket and at the other end to a terminal box 42 mounted on the front end of body 15 on the tank trailer.

A second cable 45 is connected at one end by a plug to the terminal box and extends lengthwise of the trailer to, and connects with, a lateral cable 46 intermediate its ends. One end of the lateral cable connects with the terminals of a motor 47, while the other end connects with the terminals of another motor 48. The motors are shown mounted on opposite sides of the trailer intermediate its ends, secured to a transverse support 49, although they may be located at any other convenient place, for example at the rear of the trailer. The motors are provided with switches 50 and 51, respectively, by which either one or both of the motors may be connected electrically to the generator.

As shown diagrammatically, the shaft 55 of motor 47 connects with a pump 56 and the shaft 57 of motor 48 connects with a pump 58, both pumps being secured to a transverse support 59. The pumps may, of course, vary in number and be located at any convenient place. An inlet pipe 64 connects the inlet side of pump 56 with an opening 65 in the bottom of the tank, while an outlet pipe 66 connects the outlet side of the pump with a meter 67; the meter being provided with a suitable discharge connection 68. In a similar manner, an inlet pipe 70 connects the inlet side of pump 58 with an opening 71 in the bottom of the tank while an outlet pipe 72 connects the outlet side of the pump with a meter 73; the meter being provided with a suitable discharge connection 74.

Figure 4:
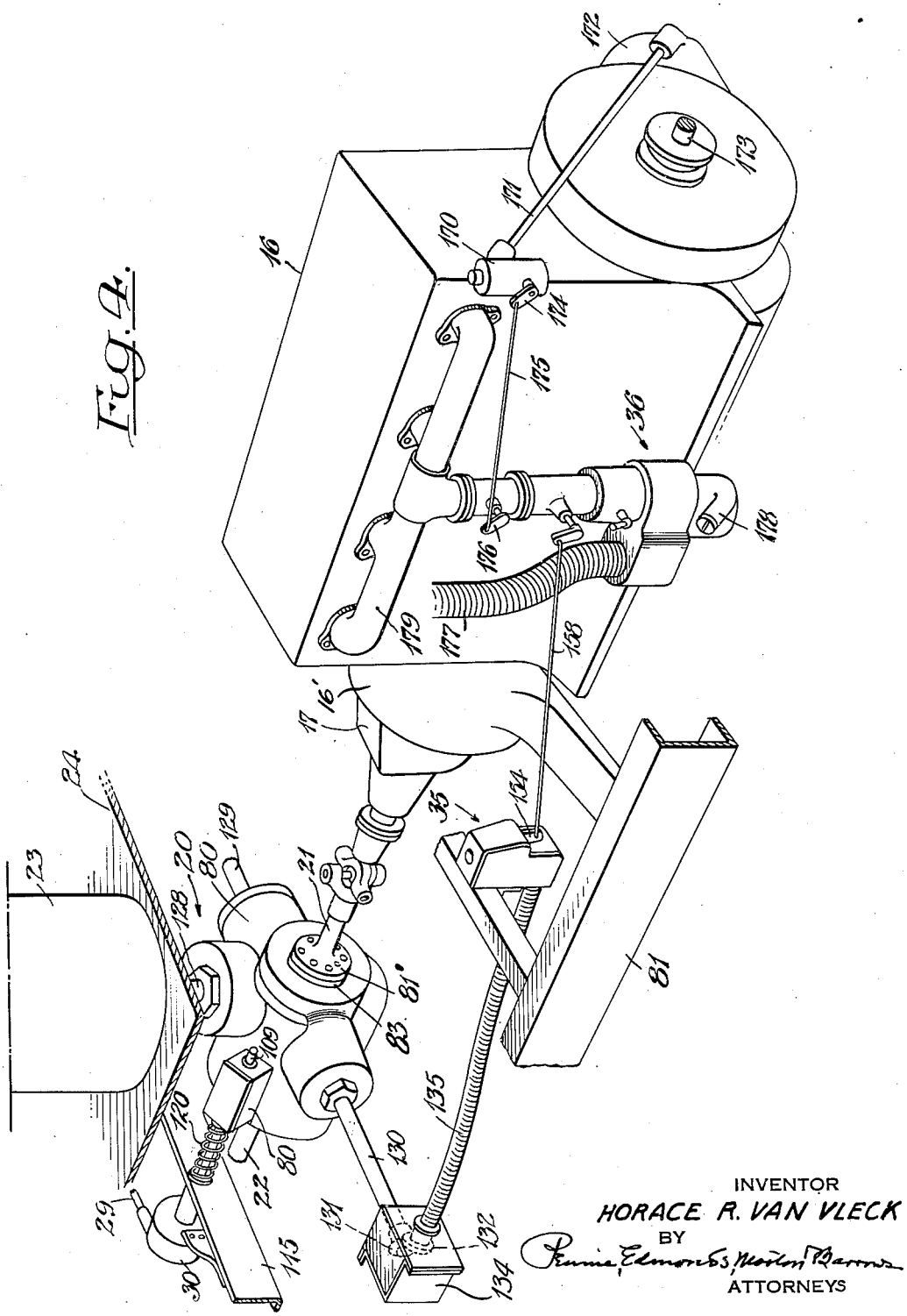
Fig. 4 is an enlarged exterior diagrammatic perspective view showing the manner in which the power take-off generator, governor and engine are coupled.

Returning to the tractor, as shown more particularly in Figs. 4 and 5, power take-off 20 is contained in a housing 80 suitably supported by tractor chassis 81. In the construction shown, moving from right to left, an end plate 81' is integrally secured to forward propeller shaft section 21, the end plate in turn being integrally secured by means of bolts to a complementary end plate 83 integrally secured to the drive shaft 84 of the power take-off. A main power take-off gear 90 is freely mounted on the drive shaft intermediate its ends. In the construction shown, a bevel gear is employed, being provided with circumferentially spaced teeth 91. The gear is normally free from rotation with the drive shaft, being supported on bearings (not shown), when the truck is in motion.

Next, moving from left to right, an end plate 93 is integrally secured to rear propeller shaft section 22, the end plate in turn being integrally secured by means of bolts to a complementary end plate 95 integrally secured to the driven shaft 96 of the power take-off. The forward end of the driven shaft terminates in a hollow socket 97 into which the rearward end of drive shaft 84 fits. Circumferentially spaced clutch teeth 98 are provided at the forward end of the hollow socket of the driven shaft.

A clutch 100 is slidably mounted on drive shaft 84 intermediate hollow socket 97 of driven shaft 96 and main power take-off gear 90. Circumferentially spaced clutch teeth 101 are provided on the rearward end of the clutch adapted operatively to mesh with hollow socket clutch teeth 98. Circumferentially spaced clutch teeth 102 are provided on the forward end of the clutch and are adapted operatively to mesh with main power take-off gear clutch teeth 103. The clutch is splined to the drive shaft in such a way that the clutch may be slid or moved back and forth longitudinally of the drive shaft and not circumferentially. A shifter 105 is associated with the clutch, the lower end of the shifter being bifurcated to form a yoke made up of a pair of spaced and opposed arms 106 and 107 fitting within a circumferential groove 108 in the mid-section of the clutch. The upper end of the shifter is integrally mounted on a lateral shaft 109 resting in spaced bearings 110 and 111 in housing 80 covering the power take-off mechanism. The rearward end of the shaft extends a suitable distance beyond power take-off housing 80 through a transverse chassis support 115 to become a piston rod 116 secured to a piston head 117 in piston cylinder 30. A metal cup or retainer 118 is integrally secured to the shaft near housing 80, being just far enough to the left to allow the necessary lateral play of the shaft without bearing against the housing. A metal cup or retainer 119 is mounted on the transverse chassis support around shaft 109. One end of a tension spring 120 mounted on the shaft is integrally secured to the first metal cup or retainer 118 and at the other end of the second metal cup or retainer 119. The spring is normally under sufficient tension to pull shaft 109 to the left as far as it will go, thus pulling shifter 105 to the left and thereby keeping clutch teeth 101 of the clutch in meshed engagement with clutch teeth 98 in hollow socket 97. In this way, power from engine 10 may be transferred directly to the rear wheels of the tractor.

In the particular construction shown, three power take-off pinion gears 125, 126 and 127 are in mesh with teeth 91 of main power take-off gear 90, the pinion gears being integrally secured to power take-off shafts 128, 129 and 130, respectively. Power take-off shaft 128 is vertically disposed and becomes, or is suitably, coupled to the shaft of generator 23. Power take-off shaft 129 is horizontally disposed and is a spare to be used for any additional purpose. Power take-off shaft 130 is also horizontally disposed, in the opposite direction, and terminates in a small bevel gear 131 secured thereto and in mesh with a small bevel gear 132 secured to the end of a flexible shaft 133, the two gears being in a housing 134 and the flexible shaft in a housing 135. A small bevel gear 140 is secured to the other end of the flexible shaft within a housing 141 for governor 35. The latter gear, in turn, meshes with a small bevel gear 142 secured to the lower end of spindle 143. The governor shown is of the conventional pendulum type with a pair of spaced and opposed balls 145 and 146 rotatably supported on the spindle by pendulums 147 and 148 and supporting arms 149 and 150, respectively. The upper end of the pendulums are secured to a rotatable collar 151 permanently positioned at the upper end of the spindle and the lower ends of the arms are secured to a rotatable collar 152 secured to a complementary grooved sleeve 153 adapted to move up and down the spindle as the balls rise and fall during their revolving movements. A bell crank lever 154 is pivotally secured to the governor housing at 155, the upper arm being bifurcated and fitting in the groove of collar 153; and the lower arm being secured to an extension rod 158 at 159. The other end of the extension rod is pivotally secured at 161 to an arm 162 integrally secured to a lateral shaft 163 extending through carburetor 36, a throttle valve or butterfly damper 164 being integrally secured to the shaft within the carburetor to regulate the flow of fuel and air therethrough to the engine.

As more particularly shown in Fig. 4, the carburetor is also provided with a conventional governor 170 suitably coupled at one side by means of a shaft 171 and gearing (not shown) in housing 172 to the crank shaft 173 of the engine. At the other side, the governor is coupled through a pivoting arm 174, an extension rod 175 and a pivot arm 176 to a throttle valve or butterfly damper (not shown). The object of this conventional governor is, of course, to make it impossible for a driver of the tractor to exceed a certain speed limit. It will be noted that the throttle valve in the carburetor for the conventional governor is placed above that of the special governor, so that the latter can be operated independently of the former. The carburetor is provided with the usual air line or duct 177 and fuel line 178 terminating in a mixing chamber in the lower part of the carburetor. The upper end of the carburetor terminates in the usual manifold 179 communicating with the piston cylinders of the engine.

The governor 35, through the mechanism above described, is effective to limit the speed of the engine, or the number of revolutions per minute thereof, to that less than permitted by the conventional governor 170.

Referring to Fig. 3, which shows the fore part of tractor 10 containing the generator as it would normally face the curb of a street, a tachometer 185 is secured to housing 24 of generator 23. The tachometer is suitably connected to the shaft of the generator or to one of the power take-off shafts to indicate the revolutions per minute of the generator when the latter is operatively coupled to power take-off 20 and engine 16. A volt meter 187 is also secured to the generator housing, being suitably connected to the generator, to indicate the amount of current voltage generated.

The apparatus just described may be operated as follows:

Normally, as pointed out above in referring to Fig. 5 more especially, spring 120 keeps shifter 105 to the left, thus keeping clutch teeth 101 of clutch 100 in meshed engagement with clutch teeth 98 in hollow socket 97. In this way, power from engine 16 may be transferred directly to the rear wheels of the tractor because forward propeller shaft section 21, drive shaft 84 of power take-off 20, driven shaft 96 of the power take-off and rear propeller shaft section 22 are coupled. These elements remain coupled whether or not transmission 17 is "in gear" with the crank shaft of engine 16. Transmission of power through the elements takes place of course only if the crank shaft is "in gear" with the transmission, in the customary manner.

When it is desired to operate generator 23 and hence power take-off 20, engine 16 is permitted to operate at a suitable but sufficient idling speed. Selector 26 is operated to open air valve 28 and thus to pass air from tank 27 through conduit 29 into piston cylinder 30. A sufficient amount of air is passed to the cylinder to force piston head 117 forwardly. This, in turn, forces piston rod 116 and hence lateral shaft 109 forwardly, thus increasing the tension in spring 120 while forcing it forwardly. As a result of this movement of lateral shaft 109, shifter 105 moves forwardly while simultaneously moving clutch 100 forwardly. This causes clutch teeth 98 and 101 to become disengaged. If the crank shaft of engine 16 and transmission 17 are not "in gear" they are now placed in that position so that power is transmitted through propeller shaft section 21 and drive shaft 84 of the power take-off. As shifter 105 continues to move still farther forward, clutch teeth 102 at the forward end of the clutch are brought into mesh with power take-off gear clutch teeth 103.

Drive shaft 84 is then locked to main power take-off gear 90 and since teeth 91 of the gear are in mesh with the teeth of pinion gears 125, 126 and 127, power take-off shafts 128, 129 and 130 are also rotated. Since power take-off shaft 129 is merely indicated as a spare, it need require no further attention. Power take-off shaft 128, however, is coupled to generator 23 so that rotation of the shaft permits the generation of electrical current. The ratio of gear teeth 91 to the teeth of pinion gear 125 is such as to permit rotation of power take-off shaft 128 and hence of generator 23 a sufficient number of revolutions per minute to permit generation of the desired amount of current voltage. It will be clear that the generator may be driven at a high speed while the engine is driven at a slow speed.

As more particularly shown in Fig. 1, current is carried from the terminals of generator 23 through cable 41 to terminal box 42 at the front end of body 15 on the tank trailer. Current is passed through second cable 45, also connected to the terminal box, and lateral cable 46 and hence the terminals of motors 47 and 48. Switches 50 and 51 are suitably operated to connect either one or both of the motors electrically to generator 23.

Rotation of power take-off shaft 130 also rotates small bevel gear 131 and hence small bevel gear 132, flexible shaft 133, small bevel gear 140 in governor 35, small bevel gear 142, spindle 143, balls 145 and 146, pendulums 147 and 148, supporting arms 149 and 150, collar 151, collar 152 and sleeve 153. The greater the speed of rotation of all of these elements, the higher balls 145 and 146 rise in housing 141 of governor 35. As the balls rise, collar 152 and sleeve 153 also rise about spindle 143. Since the collar, to which the upper arm of bell crank lever 154 is secured, is freely mounted on the lower end of sleeve 153 so that it can rise and fall therewith, although not rotating, the upper arm of bell crank lever 154 rises about pivot 155. When this occurs, the lower arm of the bell crank lever is moved inwardly toward the governor, thus pulling extension rod 158 toward the governor. This movement also pulls arm 162, which causes lateral shaft 163 to turn, whereby butterfly damper 164 is moved in a direction to throttle the mixture of fuel and air passing through carburetor 36 to engine 16.

By coupling engine 16, power take-off 20, generator 23, governor 35 and carburetor 36 in the manner indicated, the apparatus may be operated with a great deal of efficiency. The engine may be speeded up when the power take-off, and hence the generator, is first started to maintain the generator at a predetermined optimum and constant speed. This assures an immediate and constant supply of current to operate motors 47 and 48 on the trailer. Also, the engine may be slowed down when operation of the power take-off, and hence the generator, is stopped. This coupled arrangement is also highly useful because it assures a constant supply of current even when a change is made in the number of motors used on the trailer. Motor 47 may, for example, be cut in or out of the circuit while motor 48 is in operation.

In normal operations, the operator will know approximately the engine speed required to generate the desired amount of electricity. The engine is therefore permitted to idle at a somewhat higher speed, reliance being placed on special governor 35 to keep the engine throttled down automatically to the speed required to operate the generator at the speed required to generate the desired amount of current. He will of course be guided to a certain extent by the readings obtained from tachometer 185 and volt meter 187 but will depend on the special governor to increase or decrease the engine speed as required particularly on starting and stopping the generator.

It will be clear to those skilled in this art that the above-described apparatus is merely illustrative and that the practice of the invention readily lends itself to a number of useful modifications.

I claim:

1. In a motor vehicle having an engine, a carburetor for supplying a gaseous fuel mixture to the engine, a throttle valve for normally controlling the supply of gaseous mixture to the engine and a propeller shaft which is driven by the engine; the improvement which comprises a power take-off, means for selectively connecting said power take-off to and disconnecting it from said propeller shaft, a generator supported by the vehicle, means operatively connecting said power take-off to said generator, a second throttle valve for controlling the supply of gaseous fuel mixture from the carburetor to the engine independently of said first-mentioned throttle valve, said second throttle valve normally being maintained in a position inoperative to throttle the engine, a governor, means operatively connecting the power take-off to the governor for operating the same, and means operatively connecting the governor to the second throttle valve, said last-named connecting means being so controlled by the governor that when the power take-off is connected to the propeller shaft and the engine is operated above a predetermined speed above its idling speed the governor operates the second throttle valve to reduce the gaseous fuel mixture supplied to the engine, whereby when the power take-off is operatively connected to the propeller shaft the engine may be operated at a substantially constant and predetermined speed above the idling speed of the engine to assure the generation of a substantially constant and predetermined amount of electrical current.

2. In a motor vehicle having an engine, a propeller shaft which is driven by the engine, a carburetor for supplying a gaseous fuel mixture to the engine, a throttle valve for normally controlling the supply of gaseous mixture to the engine and a governor for normally preventing operation of the engine above a predetermined speed; the improvement which comprises a power take-off, means for selectively connecting said power take-off to and disconnecting it from said propeller shaft, a generator supported by the vehicle, means operatively connecting said power take-off to said generator, a second throttle valve for controlling the supply of gaseous mixture from the carburetor to the engine independently of said first-named throttle valve, said second throttle valve normally being maintained in a position inoperative to throttle the engine, a second governor, means operatively connecting the power take-off to the second governor for operating the same, and means operatively connecting the second governor to the second throttle valve, said last-named connecting means being so controlled by the governor that when the power take-off is connected to the propeller shaft and the engine is operated above a predetermined speed above its idling speed, the second governor operates the second throttle valve to reduce the gaseous fuel mixture supplied to the engine, whereby when the power take-off is operatively connected to the propeller shaft the engine may be operated at a substantially constant and predetermined speed above the idling speed of the engine and below the maximum speed permitted by the first-mentioned governor to assure the generation of a substantially constant and predetermined amount of electrical current.

3. In a motor vehicle having an engine, a propeller shaft which is driven by the engine, a carburetor for supplying a gaseous mixture to the engine and a conventional throttle valve for controlling the supply of gaseous fuel mixture to the engine; the improvement which comprises a power take-off having at least two power take-off shafts, means for selectively connecting said power take-off to and disconnecting it from said propeller shaft, a generator supported by the vehicle, one of said power take-off shafts being operatively connected to said generator, a second throttle valve for controlling the supply of gaseous fuel mixture from the carburetor to the engine independently of said conventional throttle valve, and a governor for so controlling said second throttle valve that the engine may be operated at a predetermined speed above the idling speed of the engine to assure the generation of a substantially constant and predetermined amount of electrical current, the other of said power take-off shafts being connected to said governor for operating the same.

4. In a motor vehicle having an engine, a propeller shaft which is driven by the engine, a carburetor for supplying a gaseous fuel mixture to the engine and a conventional throttle valve for controlling the supply of gaseous mixture to the engine; the improvement which comprises a power take-off having at least two power take-off shafts, means for selectively connecting said power take-off and disconnecting it from said propeller shaft, a generator supported by the vehicle, one of said power take-off shafts being operatively connected to said generator, a second throttle valve for controlling the supply of gaseous fuel mixture from the carburetor to the engine independently of said conventional throttle valve, a governor for so controlling said second throttle valve that the engine may be operated at a predetermined speed above the idling speed of the engine to assure the generation of a substantially constant and predetermined amount of electrical current, the other of said power take-off shafts being connected to said governor for operating the same, and means for rendering said governor inoperative and for maintaining said second throttle valve open when the generator is not operatively connected to the propeller shaft through said power take-off.

5. In a motor vehicle having sets of front and rear wheels, an engine, a propeller shaft for transmitting power from the engine including a drive section and a driven section, driving means operatively connecting the driven section of the propeller shaft to one of the sets of wheels, a clutch for connecting the engine to the drive section of the propeller shaft and disconnecting it therefrom, means for selectively connecting and disconnecting the drive and driven sections of the propeller shaft, a carburetor for supplying a gaseous fuel mixture to the engine and a throttle valve for normally controlling the supply of gaseous fuel mixture to the engine; the improvement which comprises a power take-off, means for selectively connecting said power take-off to and disconnecting it from the drive section of the propeller shaft, a generator supported by the vehicle, means operatively connecting the power take-off to the generator, a second throttle valve for controlling the supply of gaseous fuel mixture from the carburetor to the engine independently of the first-mentioned throttle valve, means normally maintaining the second throttle valve in a position inoperative to throttle the engine, a governor, means operatively connecting the power take-off to the governor for operating the same, and means operatively connecting the governor to the second throttle valve, the action of the last-named connecting means being so controlled by the governor that when the power take-off is connected to the drive section of the propeller shaft and the engine is operated above a predetermined speed above its idling speed, the governor operates the second throttle valve to reduce the gaseous fuel mixture supplied to the engine, whereby when the drive and driven sections of the propeller shaft are disconnected and the power take-off is operatively connected to the drive section of the propeller shaft and the drive section of the propeller shaft is operatively connected to the engine through the clutch, the engine may be operated at a substantially constant and predetermined speed above its idling speed to assure the generation of a substantially constant and predetermined amount of electrical current.

6. In a motor vehicle having sets of front and rear wheels, an engine, a propeller shaft for transmitting power from the engine including a drive section and a driven section, driving means operatively connecting the driven section of the propeller shaft to one of said sets of wheels, a clutch for connecting the engine to the drive section of the propeller shaft and disconnecting it therefrom, means for selectively connecting and disconnecting the drive and driven sections of the propeller shaft, a carburetor for supplying a gaseous fuel mixture to the engine, a throttle valve for normally controlling the supply of gaseous fuel mixture from the carburetor to the engine and a governor for normally preventing operation of the engine above a predetermined speed; the improvement which comprises a power take-off, means for selectively connecting said power take-off to and disconnecting it from the drive section of the propeller shaft, a generator supported by the vehicle, means operatively connecting the power take-off to the generator, a second throttle valve for controlling the supply of gaseous fuel mixture from the carburetor to the engine independently of said first-mentioned throttle valve, means normally maintaining said second throttle valve in a position inoperative to throttle the engine, a second governor, means operatively connecting the power take-off to the second governor for operating the same, and means operatively connecting the second governor to the second throttle valve, the action of said last-named connecting means being so controlled by the second governor that when the power take-off is operatively connected to the drive section of the propeller shaft and the engine is operated above a predetermined speed above its idling speed, the second governor operates the second throttle valve to reduce the gaseous fuel mixture supplied to the engine, whereby when the drive and driven sections of the propeller shaft are disconnected and the power take-off is operatively connected to the drive section of the propeller shaft and the drive section of the propeller shaft is operatively connected to the engine through the clutch, the engine may be operated at a substantially constant and predetermined speed above its idling speed and below the maximum speed permitted by the first-named governor to assure the generation of a substantially constant and predetermined amount of electrical current.

7. In a motor vehicle having sets of front and rear wheels, an engine, a propeller shaft for transmitting power from the engine including a drive section and a driven section, driving means operatively connecting the driven section of the propeller shaft to one of said sets of wheels, a clutch for connecting the engine to the drive section of the propeller shaft and disconnecting it therefrom, means for selectively connecting and disconnecting the drive and driven sections of the propeller shaft, a carburetor for supplying a gaseous fuel mixture to the engine, a throttle valve for normally controlling the supply of gaseous fuel mixture to the engine and a governor for normally preventing operation of the engine above a predetermined speed; the improvement which comprises a power take-off having at least two power take-off shafts, means for selectively connecting said power take-off to and disconnecting it from the drive section of the propeller shaft, a generator supported by the vehicle, one of the power take-off shafts being operatively connected to the generator, a second throttle valve for controlling the supply of gaseous fuel mixture from the carburetor to the engine independently of said first-mentioned throttle valve, means normally maintaining said second throttle valve in a position inoperative to throttle the engine, a second governor, the other of said power take-off shafts being operatively connected to said second governor for operating the same, and means operatively connecting the second governor to the second throttle valve, the action of said last-named connecting means being so controlled by the second governor that when the power take-off is connected to the drive section of the propeller shaft and the engine is operated above a predetermined speed above its idling speed, the second governor operates the second throttle valve to reduce the gaseous fuel mixture supplied to the engine, whereby when the drive and driven sections of the propeller shaft are disconnected and the power take-off is operatively connected to the drive section of the propeller shaft and the drive section of the propeller shaft is operatively connected to the engine through the clutch, the engine may be operated at a substantially constant and predetermined speed above its idling speed and below the maximum speed permitted by the first-named governor to assure the generation of a substantially constant and predetermined amount of electrical current.

HORACE R. VAN VLECK.

REFERENCES CITED

The following references are of record in the file of this patent:

UNITED STATES PATENTS

| Number | Name | Date |
|---|---|---|
| 710,788 | Lyndon | Oct. 7, 1902 |
| 900,522 | Gravell et al. | Oct. 6, 1908 |
| 997,003 | Pearson | July 4, 1911 |
| 1,002,597 | McKeen, Jr. | Sept. 5, 1911 |
| 1,064,765 | Pearson | June 17, 1913 |
| 1,191,947 | Clark | July 25, 1916 |
| 1,511,968 | Hopper | Oct. 14, 1924 |
| 1,644,562 | Jensen | Apr. 3, 1928 |
| 1,806,705 | Post, Jr. | May 26, 1931 |
| 1,824,014 | Froelich | Sept. 22, 1931 |
| 1,991,078 | Brown et al. | Feb. 12, 1935 |
| 2,023,418 | Gustafson | Dec. 10, 1935 |
| 2,051,784 | Davey | Aug. 18, 1936 |
| 2,131,527 | Sousedik | Sept. 27, 1938 |
| 2,138,100 | Howard | Nov. 29, 1938 |
| 2,178,355 | Brunner | Oct. 31, 1939 |
| 2,213,196 | Bartholomew | Sept. 3, 1940 |
| 2,379,940 | Van Vleck | July 10, 1945 |

FOREIGN PATENTS

| Number | Country | Date |
|---|---|---|
| 472,114 | Germany | Jan. 31, 1929 |
| 548,468 | Great Britain | Oct. 12, 1942 |
| 583,520 | Germany | Sept. 5, 1933 |

Certificate of Correction

Patent No. 2,472,450.

June 7, 1949.

HORACE R. VAN VLECK

It is hereby certified that errors appear in the printed specification of the above numbered patent requiring correction as follows:

Column 6, line 29, for "clutch 100" read *clutch 101*; line 30, for "101" read *100*; column 12, line 10, list of references cited, for patent number "1,644,562" read *1,664,592*;

and that the said Letters Patent should be read with these corrections therein that the same may conform to the record of the case in the Patent Office.

Signed and sealed this 8th day of November, A. D. 1949.

[SEAL]

THOMAS F. MURPHY,
*Assistant Commissioner of Patents.*